INVENTOR:
William E. Martin
BY Eberhard E. Wettey
Atty.

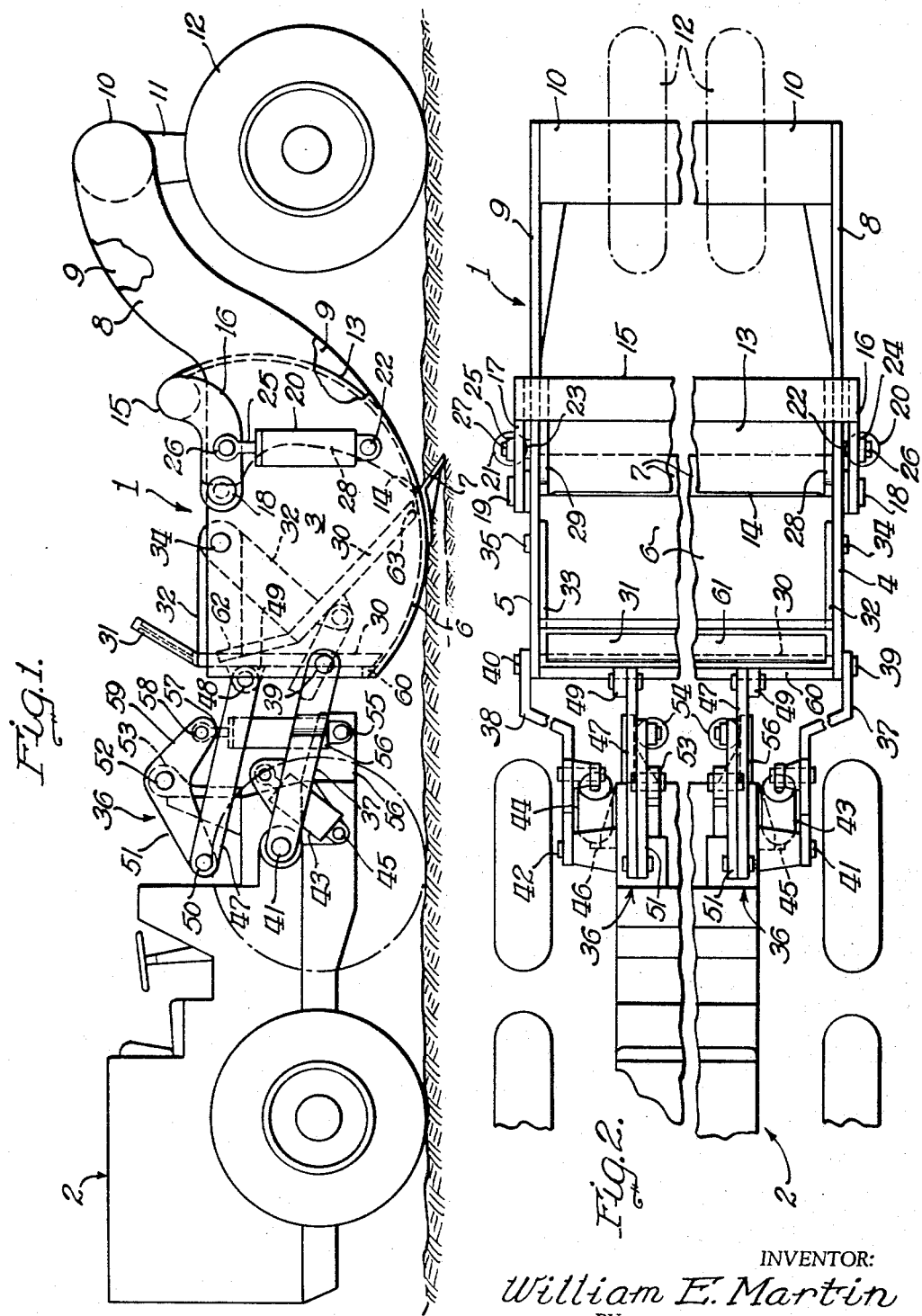

United States Patent Office 3,418,735
Patented Dec. 31, 1968

3,418,735
LOAD EJECTING WALL MECHANISM FOR SCRAPER BOWL EQUIPMENT
William E. Martin, c/o Martin Company, P. O. Box 187, Kewanee, Ill. 61443
Filed Oct. 18, 1965, Ser. No. 496,862
6 Claims. (Cl. 37—129)

ABSTRACT OF THE DISCLOSURE

A movable load ejecting wall structure for a bowl of a material handling road working scraper to normally provide a portion of the closure means for said bowl and to function as load material ejection mechanism for the bowl.

---

The present invention relates to a mechanical means embodied in a scraper bowl of a road working machine for the purpose of ejecting or dumping the bowl carried material efficiently and quickly according to the requirements of the road or surface being worked.

More specifically, the invention is directed to a scraper bowl for road working equipment and to a swingable wall arrangement for said bowl to discharge bowl carried material therefrom using power operated link means to perform the function under the control of the operator.

In the disclosure for the present invention, the mechanisms employed are used in combination with a tandem scraper and power vehicle or tractor unit arrangement to illustrate the inventive concept.

One of the objects of the present invention is to provide a scraper bowl with a movable wall or walls that may be actuated within the confines of the bowl to discharge bowl held material at a given rate and amount according to conditions of operation and under the control of an operator who normally rides on the power vehicle or tractor unit that manipulates and drives the scraper bowl arrangement.

Another object is to provide combination link means between the tandem units, namely, the scraper bowl and power tractor, which means function as bowl supporting and positioning mechanisms and as operational means to actuate the movable bowl wall or walls to eject bowl confined material.

As a further object, the combination link means for the bowl support and bowl ejection walls are made to include related parallelogram pivotal links and connections so located that they coact to keep the material ejection wall or walls in retracted and inoperative relation within the bowl while the bowl supporting link means are operated to raise or lower the bowl as the case may be.

Another object is to provide a single wall portion of the bowl that is swingably mounted on the bowl per se and which normally functions as a material retaining wall of the bowl and which may be actuated to discharge the bowl material when required.

A further object is to provide a material discharge means that is formed with connected two bowl wall portions such as the rear wall and bowl floor wall, which together form a bucket or scoop means designed to lift and to discharge the bowl load from between the side walls of the scraper bowl.

A still further object is to provide a bowl material ejection means such as swingable or movable wall portions of the bowl that coact with and discharge material through the bowl loading area under the adjustable control of a bowl closing hood at the bowl discharge end which is coincident with this bowl loading area. In this relationship, the swingable unloading bowl wall mechanism when moved to a bowl dumping or discharge position together with the bowl entrance closure hood form a hopper arrangement for the discharge of bowl material out of the forward mouth of the bowl and in given quantities that are controlled by the regulation in height of the bowl hood in respect to its normally closed position seated on the bowl floor wall or at the cutting blade or loading knife of the bowl.

Another object is to provide a solid baffle stone guard assembly as a part of the swingable bowl wall structure to aid or assist in moving bowl material in the bowl discharge operation.

All other objects and advantages of the present invention shall hereinafter appear in or become evident from the following detailed description of the invention having reference to the accompanying drawings forming a part of this specification.

In the drawings:

FIG. 1 is a side elevational view of a tandem vehicle arrangement primarily adapted for the operation and manipulation of a road working scraper bowl embodying the mechanisms of the present inventive concept;

FIG. 2 is a plan view of the same construction partially broken away and with the conventional wheel means more or less diagrammatically shown for the sake of clarity;

Figure 4:
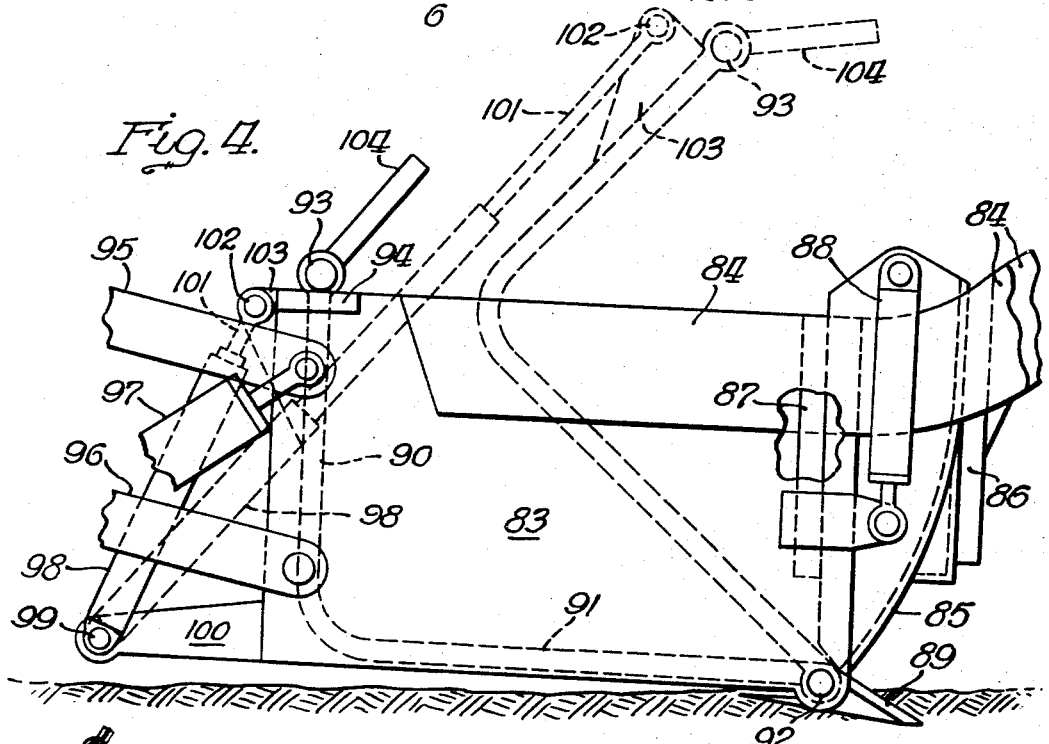
Figure 5:
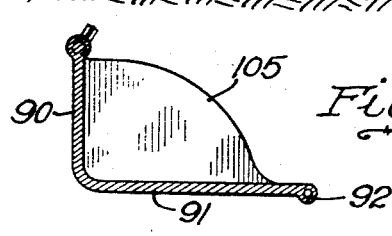

FIG. 4 is another fragmentary side elevational view of another modified arrangement of scraper bowl providing a dual connected wall structure for material discharge from the bowl with corresponding changes in the operational mechanisms employed with this construction; and FIG. 5 is a detailed longitudinal vertical sectional view of the ejector wall structure of the kind used in FIG. 4 with slight changes in the general construction thereof.

Referring now to FIGS. 1 and 2, the tandem units comprise a road scraper assembly 1 and a power vehicle or tractor 2 which together form mobile road working equipment used to pick up a load from the road or other surface, to transport such a load and to finally distribute or totally discharge the load as needed in carrying out a particular operation or job.

The road scraper comprises a material carrying bowl 3 having side walls 4 and 5, a bottom wall or floor 6 with a contiguous cutting blade or loading knife 7 at its forward end and at the loading mouth of the bowl. The side walls 4 and 5 are extended as shown at 8 and 9 to meet and connect with a transverse draft tube 10 that has a suitable mounting structure 11 connected with a transport wheel assembly 12.

While walls 4 and 5 are here extended as described it should be understood that members 8 and 9 need not necessarily be wall extensions and could be separate integrally joined members made as attached parts of walls 4 and 5 as shown in FIG. 4. Also the forward wheel assembly 12 may be a conventional type either fixed or steerable as is well known in the art.

A closure hood 13 is forwardly arched or rounded for greater bowl carrying capacity and seats at 14 on the bowl loading knife 7 at the bowl floor wall and a stabilizing transverse tube 15 tops the hood and provides side arms 16 and 17 that are pivoted at 18 and 19 on the bowl walls 4 and 5. Cylinders 20 and 21 are connected at 22 and 23 to the side walls 4 and 5 while their rams 24 and 25 connect at 26 and 27 with arms 16 and 17 to provide the means for raising and lowering the hood 13 or adjusting the position thereof over the bowl knife. The hood 13 also has side aprons 28 and 29 that flank the inside surfaces of the bowl walls 4 and 5 to counteract lateral discharge of bowl material when the hood is elevated as needed.

The rear end of the bowl is open but a rear wall 30 carrying a rock guard 31 is swingably mounted on the bowl with arms 32 and 33 connected by pivots 34 and 35 carried by the bowl side walls 4 and 5. The rear wall 30 normally closes the rear end of the bowl and may be bodily actuated to swing within the bowl to move or discharge bowl material out of the front or loading end of the bowl, which end is opened or closed a selected amount by vertical regulation of hood 13. A power operated link mechanism 36 is provided to actuate the movable rear bowl wall 30 as will be hereinafter described.

The rear end of bowl 3 is supported on links 37 and 38 pivoted on the bowl at 39 and 40, while the other ends of the links 37 and 38 are pivotally mounted on the power vehicle 2 at 41 and 42. Power cylinders 43 and 44 connect with links 37 and 38 and are suitably swingably mounted at 45 and 46 on the power vehicle 2. These cylinders 43 and 44 are double acting and serve to swing links 37 and 38 on their pivots 41 and 42 to raise or lower the scraper bowl 3 rockable on the front wheel assembly 12, all for the purpose of bringing the bowl into loading position or into transport position or into any desired elevation deemed necessary for a given set of working conditions.

The vehicle 2 is normally and conventionally suitably steerable and will then function to guide the scraper bowl asembly through the links 37 and 38 while using the same links for the vertical adjustment of the bowl 3.

The link mechanisms 36 are alike in construction so the same reference numerals will be applied to both. Each mechanism 36 occupies a position spaced equally outwardly from the centerline of the bowl and connect between the vehicle 2 to evenly spaced lateral locations on the rear wall 30 with each being constructed for equal operative effort against the wall 30.

The mechanisms 36 each comprise a push link 47 pivoted at 48 on a lug or ear 49 on the rear face of wall 30 and connected with pin 50 on the bell crank lever 51 rockable on pin 52 on a bracket 53 secured to the vehicle 2. A power cylinder 54 swings on a pivot 55 on a bracket 56 secured to the vehicle 2 and the ram 57 is connected at 58 to the other end 59 of the bell crank lever 51. Cylinder 54 is double acting and in this case both cylinders 54—54 are equally supplied with pressurized fluid to work alike in their operation against wall 30 through their respective link structure.

It should be noted that a cross rail 60 is fixedly carried at the rear end of the floor or bottom wall 6 of the bowl to provide a stop for the swinging wall 30 in its fully retracted or rearward position brought about by the retractive action of the mechanisms 36—36.

The stone guard 31, which is conventionally an open grille like structure, is in this case made with a closed baffle wall 61 to aid in holding bowl material within the bowl for discharge as is indicated at 62 with the broken line showing of the wall 30 moved into a material discharge position within bowl 3 and with the lower wall end 63 of wall 30 at the bowl knife 7 all shown in FIG. 1.

It is also important to note that links 37 and 38 together with the wall 30 operating links 47—47 are of equal lengths and are disposed in parallelogram relationship with the wall 30 when in its rearward location to close bowl 3 and up against stop rail 60. Thus the pivot locations in FIG. 1 for links 37 and 47 are 50–41 at the rear locations and 48 and 39 at the forward locations providing the corner locations of the parallelogram link structure at the near side of the machine. The far side like means are the same as explained.

With this arrangement, bowl adjustment vertically by links 37 and 38 will not altar or change the position of wall 30 by its own attached link means when the bowl is loaded and the wall occupies the position to the rear and upright in the bowl as shown in FIG. 1. Obviously, manipulation of the swingable wall 30 by mechanisms 36—36 will not affect the bowl position vertically as maintained by the bowl elevating and lowering links 37 and 38.

It should be further noted how the forwardly swung position of wall 30 and the hood 13 together form a hopper arrangement when viewed in FIG. 1 to cause free flow material discharge over the knife 7, with the hood being raised from the knife location to permit the material discharge as required.

Figure 3:
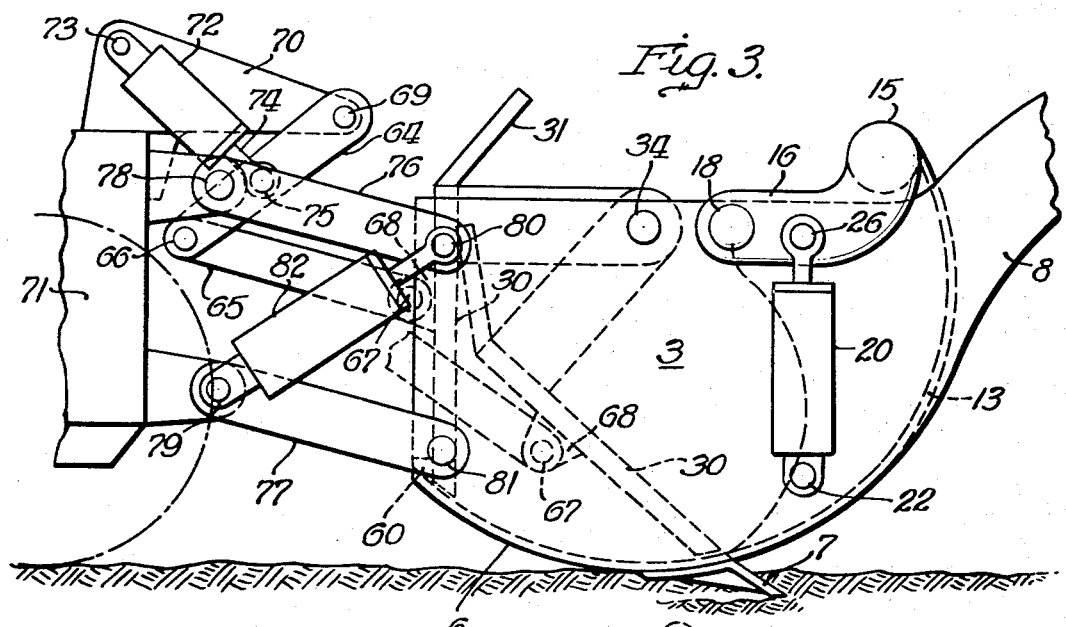
FIG. 3 is a fragmentary side elevational view of a modified arrangement of scraper bowl and the controlling link means of this invention.

In the FIG. 3 construction, the bowl 3 retains its general hood and rear wall structure as in FIGS. 1 and 2 and as indicated by the reference numerals. In this construction the link means for wall 30 comprises a pair of links 64 and 65 connected at 66 to pivot, with link 65 joined by pin 67 with lug 68 on wall 30. Link 64 swings about a pivot 9 on a bracket 70 mounted on a power vehicle 71 and a power cylinder 72 swings on pivot 73 on bracket 70 and the ram 74 connects with link 64 at pin 75. This link means actuates the swingable wall 30.

The bowl supporting and elevating or lowering link means comprises a pair of parallel links 76 and 77 mounted on spaced pins 78 and 79 on vehicle 71 while the other ends of these same links are joined with pins 80 and 81 on the side wall 4 of the bowl 3. A power cylinder 82 is swingably mounted on pin 79 and connects diagonally to connect with pin 80 to function crosswise between links 76 and 77 as shown in FIG. 3 to cause controlled bowl manipulation up or down.

In this case all three links 76, 77 and 65 are the same length and their pin end locations again create a parallelogram relationship between these link sets to keep the wall 30 against stop 60 when the bowl links are operated as previously described.

FIG. 4 illustrates a dual wall ejection means in a bowl 83 equipped with side extensions such as 84 that lead to a wheel assembly as in FIG. 1. The bowl mouth is closed with a vertically slidable hood 85 guided between ways 86 and 87 and which is vertically adjustable by means of cylinders such as 88. The forward edge of the bowl 83 has the loading knife 89 to cause material to boil up into the bowl under forward motion of the scraper unit.

Bowl 83 has two side walls in this arrangement and an ejection means is provided having a rear wall 90 connected with a floor or bottom bowl wall 91 that are together pivoted at 92 on the forward edge of bowl 83. Side overhang stop pins 93 rest upon reenforced bowl side lugs 94 to position the swingable bowl wall unit in its normal bowl loading position.

Links 95 and 96 with cylinder 97 carry and adjust the bowl height as in the arrangement shown in FIG. 3. However, this bowl construction carries a telescopic cylinder 98 at 99 on the bowl bracket 100 and the cylinder ram 101 is connected with pin 102 on a lug or ear 103 secured to the rear face of the rear wall 90. Operation of cylinder 98 will then swing the integral L-shaped wall structure 90 and 91 with the attached stone guard 104 into the broken line position to dump or discharge the material in the bowl with hood 85 open a desired amount. Here again, the dual movable wall and the hood together form a hopper like discharge arrangement as previously described.

The dual wall dump means in FIG. 4 is open at the sides, but as shown in FIG. 5, the same dump means may be provided with suitable side walls or baffles such as 105 if desired to further hopper confine the load being discharged from the carrying bowl.

The above described forms of the invention are only being disclosed as preferred constructions by way of example and not by way of limitation of the concept of the present invention. Changes are contemplated in the combinations shown or in the individual elements of the combinations without departing from the invention described.

What I claim is:

1. In combination in a tandem connected scraper bowl assembly and a power vehicle unit therefor arranged for relative and independent manipulation with respect to each other when adjacently joined in operative union comprising a scraper bowl unit, mobile means to support one end of said bowl unit, a first link means mounted upon said power vehicle unit and connected with another end of said bowl unit including power cylinder means to actuate said link means to raise and lower said bowl unit, a swingable material ejection wall mounted on said bowl unit, and a second link means mounted on said power vehicle unit and providing a terminal link to extend across the space between said relatively movable power vehicle unit and bowl unit and directly connected with said swingable wall of said bowl unit, said second link means including power cylinder means to actuate said swingable wall by said latter link means for discharging material from within said bowl unit.

2. In the combination of claim 1, wherein said second link means includes a bracket member carried upon one of said units, a lug member on said swingable material ejection wall and a power cylinder mounted upon one of said joined units and operably connected with a link of said second link means to cause said swingable material ejection wall to sweep through said bowl unit during operation of said cylinder.

3. In the combination of claim 1, wherein at least one of said link means includes a pair of vertically spaced links extending between said units and wherein the power cylinder of said one link means is connected diagonally between said spaced links of said one link means to bridge the space directly between the power vehicle unit and the bowl unit to provide a connection for the cylinder with one link at the power vehicle unit and with the other link at the bowl unit.

4. In the combination of claim 1, wherein said bowl unit includes a fixed curved load bearing floor to accommodate the sweep of the end portion of the swingable ejection wall and wherein a stop means is provided on said fixed floor for contact by the end portion of said swingable ejection wall when said wall is moved to inoperative bowl unit closing position by said second link means.

5. In combination in a tandem connected scraper bowl assembly and a power vehicle unit therefor comprising a scraper bowl unit, mobile means to support one end of said bowl unit, a first link means mounted upon said power vehicle unit and connected with another end of said bowl unit including power cylinder means to actuate said link means to raise and lower said bowl unit, a swingable material ejection wall mounted on said bowl unit, and a second link means mounted on said power vehicle unit and connected with said swingable wall including power cylinder means to actuate said swingable wall by said latter link means for discharging material from within said bowl unit, and wherein said second link means includes a push link connected with the bowl unit and said first link means include a supporting terminal bowl unit link as the final link connection of said first link means to the bowl unit, said push link and terminal link being of equal length and mounted between pivotal locations to provide a parallel link arrangement whereby said swingable ejection wall is maintained in its fully retracted bowl unit closing position by said second link means in an unaffected condition while said first link means are operated to change the elevation of the bowl unit in respect to the surface being worked.

6. A scraper for an earth working machine adapted for working support upon and manipulation by a power vehicle comprising a material handling scraper bowl having rockable mobile means to carry one end of said bowl over the surface being worked, a transverse material ejecting wall mounted on said bowl to swing through the bowl from a fully retracted bowl loaded position to various bowl material ejecting positions, a first cylinder operated link means mountable upon the power vehicle including at least one push link having one end thereof pivoted on its attendant link means and its other end pivotally connected with the swingable wall to actuate said wall, and a second cylinder operated link means mountable upon the power vehicle including at least one support link having one end thereof pivoted on its attendant link means and its other end pivotally connected with the other unsupported end of said bowl to raise and lower that bowl end, said push link and said support link being arranged to occupy parallel positions with their respective end pivots disposed in parallelogram relationship in relation to each other when said bowl material ejecting wall occupies a fully retracted position in the bowl, whereby the link attached end of the bowl can be raised or lowered without displacing the material ejecting wall while the latter wall can be operated to eject material from the bowl without affecting the elevation of the bowl as established through the bowl raising and lowering link means.

References Cited

UNITED STATES PATENTS

| | | |
|---|---|---|
| 2,095,759 | 10/1937 | Maloon. |
| 2,303,650 | 12/1942 | Low. |
| 2,416,592 | 2/1947 | Patterson. |
| 2,861,360 | 11/1958 | Allin. |
| 2,965,988 | 12/1960 | Monk _____ 37—126 |
| 3,316,822 | 5/1967 | Seaman _____ 37—129 X |

ABRAHAM G. STONE, *Primary Examiner.*

ALAN E. KOPECKI, *Assistant Examiner.*